(12) United States Patent
Vukojevic et al.

(10) Patent No.: US 11,284,160 B2
(45) Date of Patent: *Mar. 22, 2022

(54) START-UP PERFORMANCE IMPROVEMENT FOR REMOTE APPLICATION

(71) Applicant: Nvidia Corporation, Santa Clara, CA (US)

(72) Inventors: Bojan Vukojevic, Santa Clara, CA (US); Franck Diard, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/012,536

(22) Filed: Sep. 4, 2020

(65) Prior Publication Data

US 2020/0404379 A1  Dec. 24, 2020

Related U.S. Application Data

(63) Continuation of application No. 15/166,635, filed on May 27, 2016, now Pat. No. 10,798,457.

(60) Provisional application No. 62/167,122, filed on May 27, 2015.

(51) Int. Cl.
| | | |
|---|---|---|
| *H04N 21/478* | (2011.01) | |
| *A63F 13/88* | (2014.01) | |
| *H04N 21/438* | (2011.01) | |
| *A63F 13/48* | (2014.01) | |

(52) U.S. Cl.
CPC ......... *H04N 21/4781* (2013.01); *A63F 13/48* (2014.09); *A63F 13/88* (2014.09); *H04N 21/4384* (2013.01)

(58) Field of Classification Search
CPC ............ H04N 21/4781; H04N 21/4384; A63F 13/48; A63F 13/88
See application file for complete search history.

(56) References Cited

U.S. PATENT DOCUMENTS

| | | | |
|---|---|---|---|
| 6,173,445 B1 * | 1/2001 | Robins | .................... G06F 9/451 717/173 |
| 2002/0122058 A1 | 9/2002 | Kutaragi et al. | |
| 2004/0148221 A1 | 7/2004 | Chu | |
| 2008/0194332 A1 | 8/2008 | Kadikario et al. | |
| 2014/0171204 A1 | 6/2014 | Cox et al. | |
| 2014/0286390 A1 * | 9/2014 | Fear | ...................... H04N 19/42 375/240.01 |
| 2016/0346689 A1 | 12/2016 | Vukojevic | |

* cited by examiner

*Primary Examiner* — Werner G Garner

(57) ABSTRACT

A method for remotely provisioning resources for running a computer application is described. The method includes: receiving a request to execute a computer application using a virtual machine, the computer application having a static video portion and a user interactive video portion; while preparing the user interactive video portion, providing the static video portion to a user device remotely positioned relative to a server hosting the virtual machine; and streaming the user interactive video portion to the user device at an end of the static video portion. A start time of the static video portion is adjusted to accommodate a display time of the static video portion being different than a time required to prepare the user interactive video portion. A server and a system that are capable of performing the above method are also described.

20 Claims, 4 Drawing Sheets

START-UP PERFORMANCE IMPROVEMENT FOR REMOTE APPLICATION

CROSS-REFERENCE TO RELATED APPLICATION

This application is a continuation application of U.S. patent application Ser. No. 15/166,635, filed by Vukojevic, et al. on May 27, 2016, entitled "START-UP PERFORMANCE IMPROVEMENT FOR REMOTE VIDEO GAMING," which claims the benefit of U.S. Provisional Application Ser. No. 62/167,122, filed by Vukojevic et al. on May 27, 2015, entitled "Method For Speeding Up Game Start-Up Time," wherein the above-listed applications are commonly assigned with present application and are incorporated herein by reference in their entirety.

TECHNICAL FIELD

This application is directed, in general, to video program interaction and, more specifically, to techniques for remotely provisioning resources for running a computer application.

BACKGROUND

User interactive videos, such as video gaming, have rapidly increased in popularity as types of user devices supporting these games have increased, especially those that support playing a video game running remotely from the user device on a cloud-based gaming server, for example. In addition to providing a menu-based interactive video game, the remote gaming server usually provides introductory information in the form of a static video that precedes a menu-based, interactive portion of the video game. Currently, requesting a remote video game by a user starts a resource provisioning process that culminates in the video game running and the introductory information static video being ready to display. However, this resource provisioning process may require as long as 20 seconds to complete. During this 20 second time period, local user devices typically display a "Please Wait" message which detracts from the user's overall experience in playing the game. What is needed in the art is a way to enhance a user's experience during this time by reducing or eliminating this wait time.

SUMMARY

In one embodiment, a server for remotely provisioning resources for running a computer application is provided. The server includes a memory; and a processor connected to the memory and configured to provide a virtual machine performing operations. The operations include: receiving a request to execute a computer application using the virtual machine, the computer application having a static video portion and a user interactive video portion; while preparing the user interactive video portion, providing the static video portion to a user device remotely positioned relative to the server; and streaming the user interactive video portion to the user device at an end of the static video portion. A start time of the static video portion is adjusted to accommodate a display time of the static video portion being different than a time required to prepare the user interactive video portion.

In another aspect, the method for remotely provisioning resources for running a computer application is provided. The method includes: receiving a request to execute a computer application using a virtual machine, the computer application having a static video portion and a user interactive video portion; while preparing the user interactive video portion, providing the static video portion to a user device remotely positioned relative to a server hosting the virtual machine; and streaming the user interactive video portion to the user device at an end of the static video portion. A start time of the static video portion is adjusted to accommodate a display time of the static video portion being different than a time required to prepare the user interactive video portion.

In yet another aspect, a system for remotely provisioning resources for running a computer application is provided. The system includes a user device; and a server including a memory and a processor connected to the memory, wherein the processor is configured to provide a virtual machine performing operations that include: receiving a request to execute a computer application using the virtual machine, the computer application having a static video portion and a user interactive video portion; while preparing the user interactive video portion, providing the static video portion to the user device; and streaming the user interactive video portion to the user device at an end of the static video portion, wherein the user device is remotely positioned relative to the server and configured to play the user interactive video portion at the end of the static video portion. A start time of the static video portion is adjusted to accommodate a display time of the static video portion being different than a time required to prepare the user interactive video portion.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Embodiments of the present disclosure provide a user with an enhanced experience when participating in a remote interactive video such as a video game. This is accomplished by greatly shortening or eliminating a wait time associated with a game starting up thereby giving the user visual feedback that the video game is underway during a time when the remote video game is initializating for play. This is accomplished without employing resources needed to provision or play the game.

Figure 1:
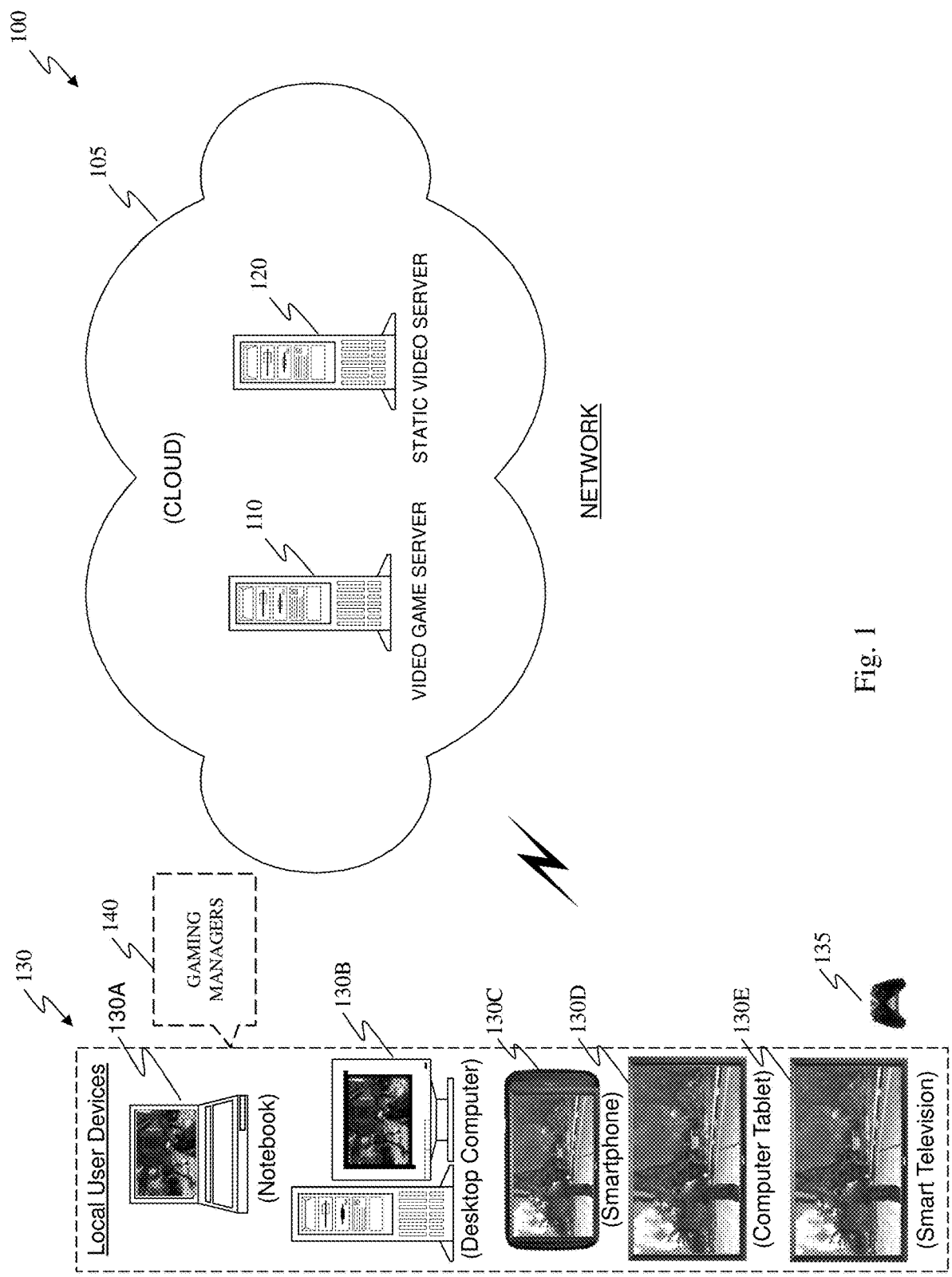
FIG. 1 illustrates a gaming system constructed according to the principles of the present disclosure.

FIG. 1 illustrates a gaming system, generally designated 100, constructed according to the principles of the present disclosure. The gaming system 100 includes a communications network 105 having a video game server 110 and a static video server 120, and examples of local user devices 130, wherein each of the local user devices 130 employs one of a group of gaming managers 140, which indicates a general gaming manager representation and distribution in this illustration. The video game server 110 is representative of an interactive video server chosen for purposes of discussion in this disclosure and is an example of a general and broader class of applicable interactive video servers.

The collection of local user devices 130 includes a notebook computer 130A, a desktop computer 130B, a smartphone 130C, a computer tablet 130D and a smart television 130E employing a gaming controller 135. As noted, each of the local user devices 130 in this example includes a separate gaming manager for control and display of a static video portion and provides a user interface to a user interactive video portion for its display and game play. Additionally, each separate gaming manager provides access to the video game and static video servers 110. 120 through the communications network 105.

Each of the gaming managers 140 includes a video control unit and a video receiving unit. The video control unit starts a video game running remotely having the static video portion and the user interactive video portion. The video receiving unit is coupled to the video control unit and receives the static video portion for local display while the user interactive video portion is being initialized remotely for subsequent local game play. Each of the local user devices initially displays the static video portion and provides a user interface for the subsequent local game play following completion of remote initialization (remote resource provisioning) of the the user interactive video portion.

The communications network 105 is representative of a public or private network that supports communication between the local user devices 130 and the video game and static video servers 110, 120. The communications network 105 may employ wireless or wireline connections and generally may include the Internet, a cellular communications network or a WI-FI network, for example.

In this embodiment, The video game server 110 provides all interactive video gaming streams for the local user devices 130. Additionally, the video game server 110 is capable of providing both user interactive video gaming portions or streams and corresponding static video streams for some of its applications. Correspondingly, the static video server 120 provides those static video portions or streams that are not provided by the video game server 110.

Initially, a user requests a game to play and this request is routed using latency-based routing to a data center near the user's location. Inside the data center, the request is authenticated and authorized to determine who the user is and whether they have the privilege of and permission to launch the game requested. Then, the necessary resources are provisioned to run the game. This provisioning includes finding a virtual machine (e.g., the video game server 110) that is capable of executing the game and attaching game binaries to the virtual machine.

Continuing the remote initialization process includes warming up an encoder, setting up the environment to run the game and finding a starting point of the game based on where the user left off previously playing the game. Once the game is stored and initialized on the virtual machine, the game is started. When the game is started, the game enters a menu mode, which skips an initial static video portion that is normally provided for user viewing at this time, since embodiments of the present disclosure play this static video portion while the process discussed above is taking place.

Embodiments of the present disclosure offer several approaches to providing the static video prerecorded bit stream to one or more of the local user devices 130 for proper display with respect to playing the game. In one approach, the video game server 110 (located in a network data center) can actually play the static video stream at a user's game request time. Then, an associated game streaming protocol captures virtual screens while this video is playing on the video game server 110, compresses them and delivers them to a selected one of the local user devices 130. In this case, the video game server 110 plays the static video portion while preparing its resources and then sends it to the selected one of the local user devices 130 for gameplay.

In another case, the video game server 110 focuses on preparing the resources needed for the game and instructs the appropriate local user device during this time to fetch a corresponding static video file from the static video server 120, where the static video stream is stored. Alternately, the static video file may be stored (cached) on the local user device and played back during video game initialization.

Ideally, the transition from playing the static video to playing the game needs to be seamless. For this to happen, playing of the static video has to be started at just the right time. This may also imply that the static video stops playing just after all of the game resources are ready or shortly after all of the game resources are ready.

This may be accomplished by tracking how long it takes to provision the game resources for initiating the game at the user's previous stopping point. This is game dependent and usually very different from game to game. Some games save only a few files while other games save many files. This generally may cause game start times to vary somewhat. So, the start time for each individual game to reach this point is maintained at each pertinent data center and provided to a local user device being employed. Additionally, both a static video run time and a game resource provisioning time are provided to the local user device in order to determine an interactive video start time.

For example, if the static video file length is 15 seconds and the game resource provisioning time is less than 15 seconds, the static video needs to be started as close to requesting the game as possible. Additionally, if the static video file length is 15 seconds and it requires 17 seconds to provision all required game resources, this would dictate an initial delay time for starting the static video of about two to three seconds.

Figure 2:
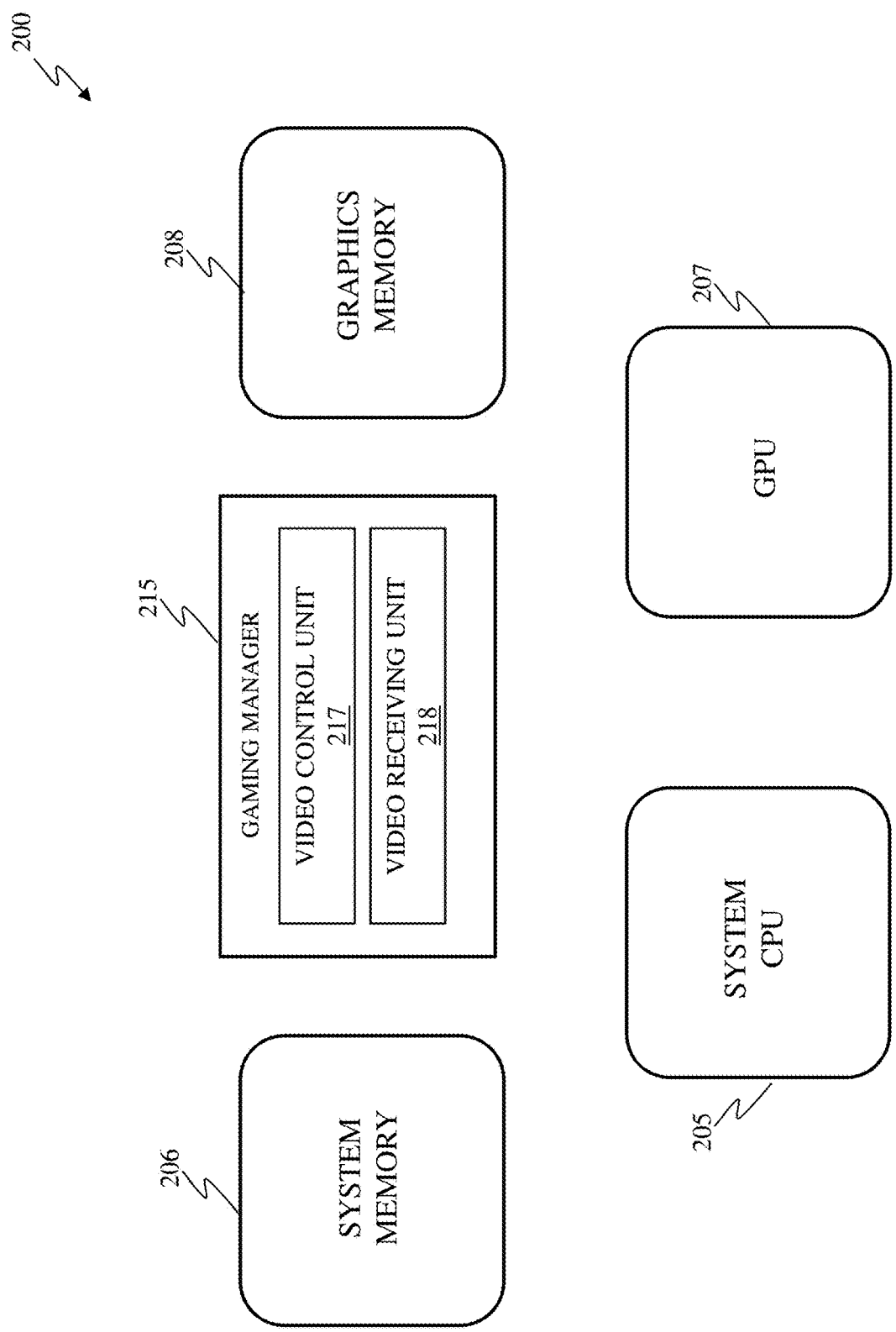
FIG. 2 illustrates a diagram of a local user device as may be employed in FIG. 1.

FIG. 2 illustrates a diagram of a local user device, generally designated 200, as may be employed in FIG. 1. The local user device 200 illustrates an embodiment of a general purpose computing device that may typically accommodate a wide variety of computer application software, including a computer gaming application is indicated above. The local user device 200 is capable of receiving streamed display information and is generally representative of the remote user devices 130 of FIG. 1, although local user devices 130C, 130D and 130E may only employ a subset of the units shown in FIG. 2.

Here, the local user device 200 includes a system central processing unit (CPU) 205, a system memory 206, a graphics processing unit (GPU) 207 and a graphics memory 208. The local user device 200 also includes a gaming manager 215 having a video control unit 217 and a video receiving unit 218. The system CPU 205 is coupled to the system memory 206 and the GPU 207 to provide general computing processes and control of operations for the local user device 200. The system memory 206 may include long term memory storage for computer applications and random access memory (RAM) to facilitate computation by the system CPU 205. The GPU 207 is further coupled to the graphics memory 208 to provide display and frame control information.

The gaming manager 215 is generally indicated in the local user device 200, and in one embodiment, includes a software module that may correspond to software included with a computer application or software that is independent of the computer application. The video control and video receiving units 217, 218 may operationally reside in the system memory 206, the graphics memory 208 or in portions of both. The video receiving and video processing units 217, 218 may alternately include a hardware portion or be totally implemented in hardware. Pertinent static video portions may be stored in the system memory 206 or the graphics memory 208 to provide locally availability for future access.

Figure 3:
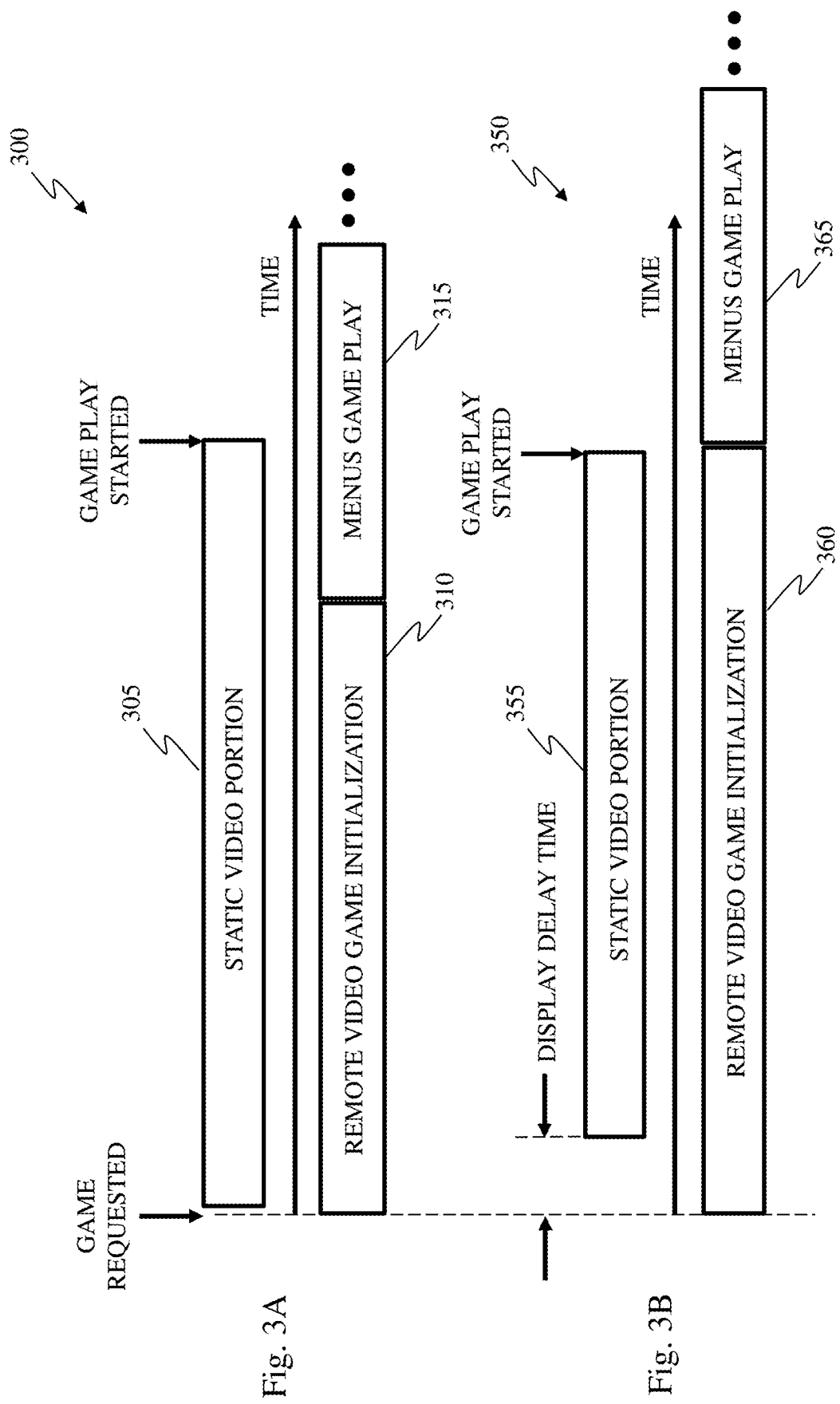
FIGS. 3A and 3B illustrate timing diagrams constructed according to the principles of the present disclosure.

FIGS. 3A and 3B illustrate timing diagrams, generally designated 300 and 350, constructed according to the principles of the present disclosure. The timing diagrams 300 and 350 show timing relationships between static video portions and remote video game initialization times for two different timing conditions. The timing diagram 300 includes a static video portion 305 and a corresponding remote video game initialization period of time 310. The timing diagram 350 includes a static video portion 355 and a corresponding remote video game initialization period of 360.

In the timing diagram 300, it may be seen that the static video portion 305 is greater (i.e., runs a longer time) than its corresponding video game initialization 310 requires. This condition allows display of the static video portion 305 to begin when the game is requested, as shown. This condition also allows a seamless transition from displaying the static video portion 305 to playing of the game, since the game is ready to play when the static video stream ends, as indicated by a menus game play 315.

In the timing diagram 350, it may be seen that the static video portion 355 is less (i.e., runs a shorter time) than its corresponding remote video game initialization 360. This condition dictates that the display of the static video portion 355 begin after the game is requested, as shown, if a seamless transition from displaying the static video portion 355 to playing of the game (menus game play 365) is desired. However, this initial display delay time may be seen to be much shorter than having to wait for the video game initialization 360 to complete before displaying the static video portion 355. Although not shown, display of the static video portion 355 can begin when the game is requested, thereby requiring a display delay to occur just before the game is ready for playing.

Figure 4:
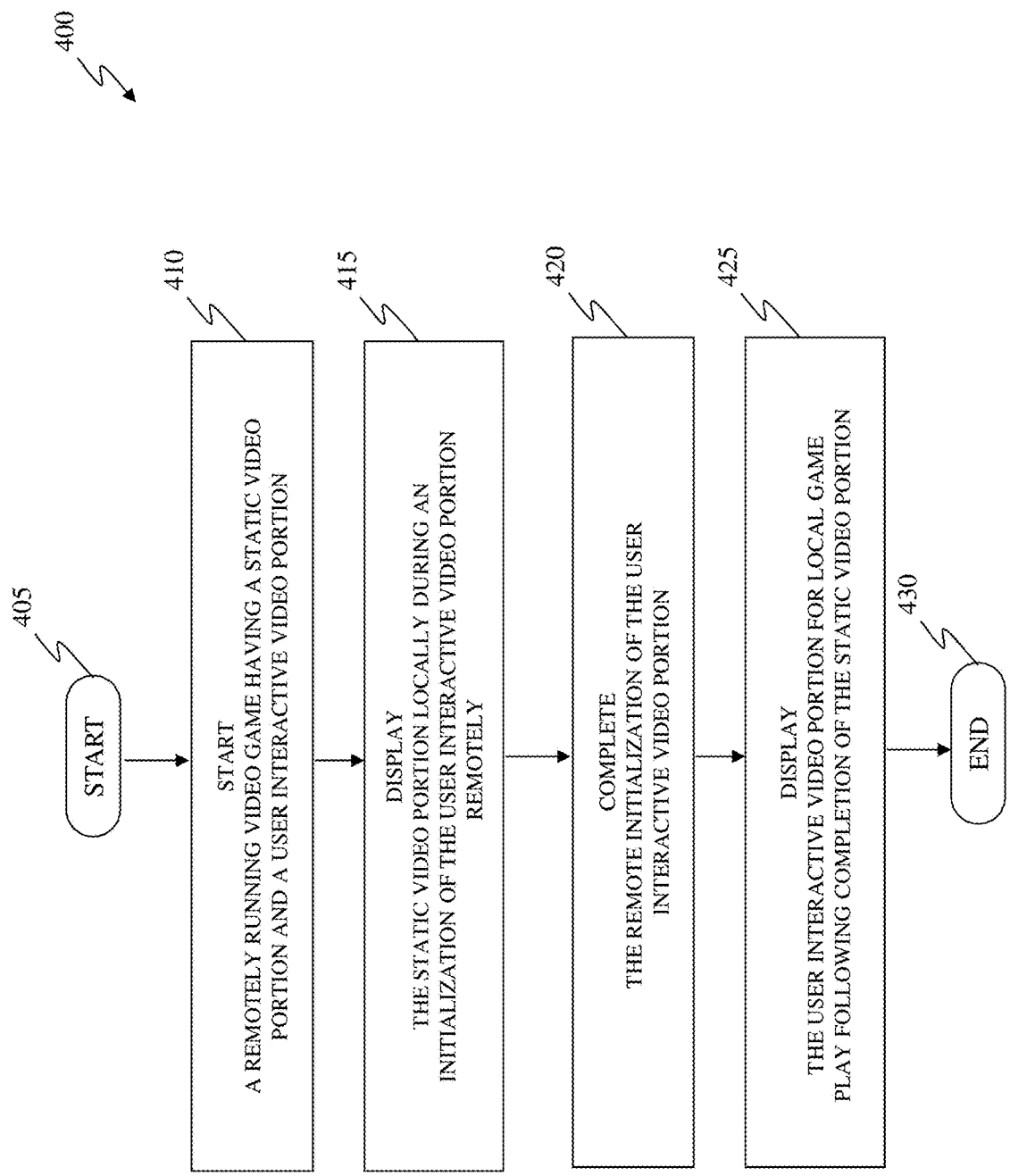
FIG. 4 illustrates a flow diagram of an embodiment of a method of managing a remote game carried out according to the principles of the present disclosure.

FIG. 4 illustrates a flow diagram of an embodiment of a method of managing a remote game, generally designated 400, carried out according to the principles of the present disclosure. The method 400 starts in a step 405. Then, a remotely running video game having a static video portion and a user interactive video portion is started, in a step 410. The static video portion is displayed locally during an initialization of the user interactive video portion remotely, in a step 415. The remote initialization of the user interactive video portion is completed, in a step 420. And, the user interactive video portion is displayed for local game play following completion of the static video portion, in a step 425.

In one embodiment, the static video portion is provided from a video game server that also provides the user interactive video portion. In another embodiment, the static video portion is provided from a static video server separate from the video game server that provides the user interactive video portion. In a further embodiment, the static video portion is stored locally and available for future access.

In still a further embodiment, a start time of the static video portion is adjusted to accommodate a display time of the static video portion being different than an initialization time required by the user interactive video portion. In one case, the start time of the static video portion is delayed corresponding to the display time of the static video portion being shorter than a required initialization time of the user interactive video portion. In another case, the start time of the static video portion is advanced corresponding to the display time of the static video portion being longer than a required initialization time of the user interactive video portion. The method 400 ends in a step 430.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A server for remotely provisioning resources for running a computer application, comprising:
    a memory; and
    a processor connected to the memory and configured to provide a virtual machine performing operations that include:
        receiving a request to execute the computer application using the virtual machine, the computer application having a static video portion and a user interactive video portion;
        while preparing the user interactive video portion, providing the static video portion to a user device remotely positioned relative to the server; and
        streaming the user interactive video portion to the user device at an end of the static video portion, wherein a start time of the static video portion is adjusted to accommodate a display time of the static video portion being different than a time required to prepare the user interactive video portion.

2. The server of claim 1, wherein the static video portion ends when the user interactive video portion is prepared.

3. The server of claim 1, wherein the operations further include storing the time required to prepare the user interactive video portion in the memory.

4. The server of claim 3, wherein the operations further include providing the time for the preparing the user interactive video portion to the user device.

5. The server of claim 1, wherein the providing the static video portion includes instructing the user device to fetch the static video portion from a static video server.

6. The server of claim 1, wherein the providing the static video portion includes instructing the user device to fetch the static video portion from a stored location in the user device.

7. The server of claim 1, wherein the providing the static video portion includes playing the static video portion at the user device.

8. A method of remotely provisioning resources for running a computer application, comprising:
   receiving a request to execute the computer application using a virtual machine, the computer application having a static video portion and a user interactive video portion;
   while preparing the user interactive video portion, providing the static video portion to a user device remotely positioned relative to a server hosting the virtual machine; and
   streaming the user interactive video portion to the user device at an end of the static video portion, wherein a start time of the static video portion is adjusted to accommodate a display time of the static video portion being different than a time required to prepare the user interactive video portion.

9. The method of claim 8, wherein the static video portion ends when the user interactive video portion is prepared.

10. The method of claim 8, further comprising tracking the time required to prepare the user interactive video portion.

11. The method of claim 10, further comprising providing the time required to prepare the user interactive video portion to the user device.

12. The method of claim 8, wherein the providing the static video portion includes instructing the user device to fetch the static video portion from a static video server.

13. The method of claim 8, wherein the providing the static video portion includes instructing the user device to fetch the static video portion from a stored location in the user device.

14. The method of claim 8, wherein the providing the static video portion includes playing the static video portion at the user device.

15. A system for remotely provisioning resources for running a computer application, comprising:
   a user device; and
   a server including a memory and a processor connected to the memory, wherein the processor is configured to provide a virtual machine performing operations that include:
      receiving a request to execute the computer application using the virtual machine, the computer application having a static video portion and a user interactive video portion;
      while preparing the user interactive video portion, providing the static video portion to the user device; and
      streaming the user interactive video portion to the user device at an end of the static video portion, wherein the user device is remotely positioned relative to the server and configured to play the user interactive video portion at the end of the static video portion;
   wherein a start time of the static video portion is adjusted to accommodate a display time of the static video portion being different than a time required to prepare the user interactive video portion.

16. The system of claim 15, wherein the static video portion ends when the user interactive video portion is prepared.

17. The system of claim 15, wherein the operations further include storing the time required to prepare the user interactive video portion in the memory.

18. The system of claim 17, wherein the operations further include providing the time required to prepare the user interactive video portion to the user device.

19. The system of claim 15, wherein the providing the static video portion includes instructing the user device to fetch the static video portion from a static video server.

20. The system of claim 15, wherein the providing the static video portion includes instructing the user device to play the static video portion from a stored location in the user device.

* * * * *